Aug. 16, 1949.   G. E. REDFIELD   2,479,512
PHONOGRAPH DRIVE
Filed Nov. 26, 1945
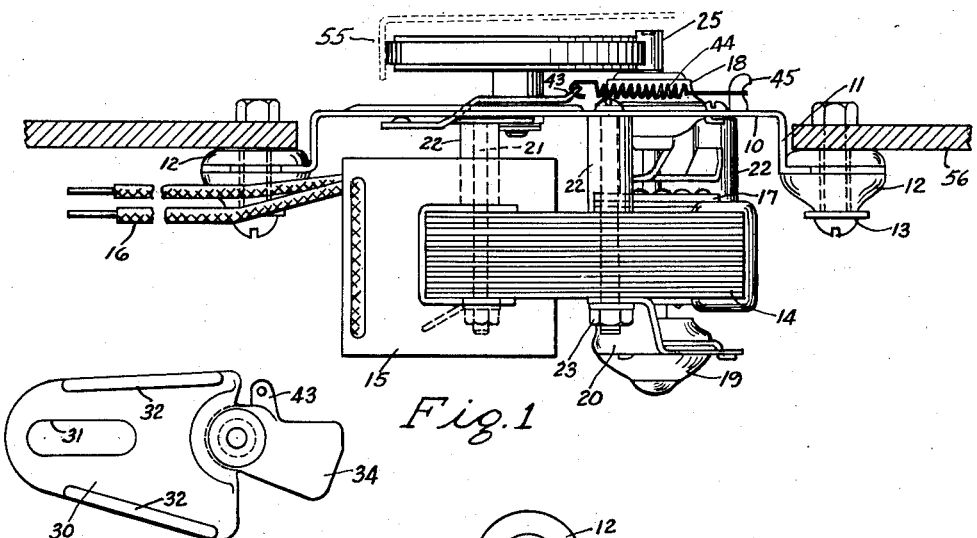
Fig.1
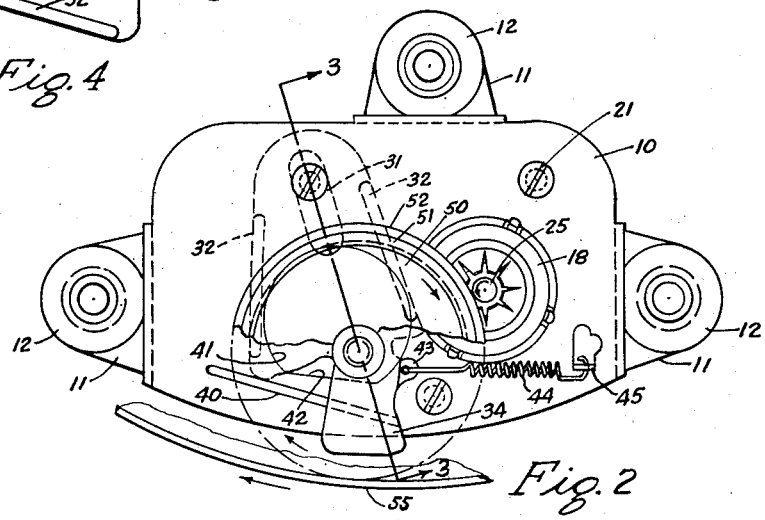
Fig.4
Fig.2
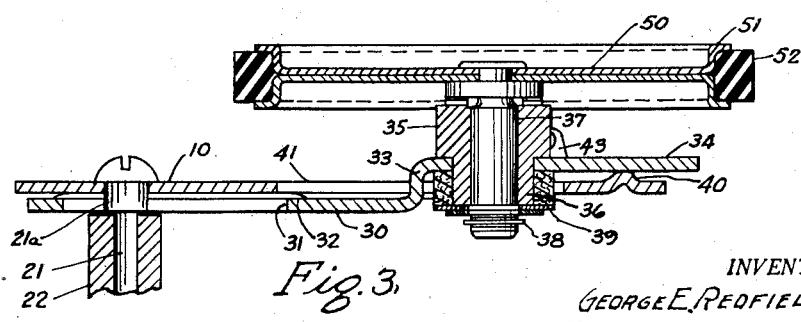
Fig.3
INVENTOR.
GEORGE E. REDFIELD
BY
J. D. Douglas Patented Aug. 16, 1949

2,479,512

UNITED STATES PATENT OFFICE 2,479,512

PHONOGRAPH DRIVE

George E. Redfield, Chicago, Ill., assignor to Admiral Corporation, Chicago, Ill., a corporation of Delaware Application November 26, 1945, Serial No. 630,709

7 Claims. (Cl. 74—206)

This invention relates to improvements in record players, and more particularly to an improved motor drive for a phonograph record player.

As is well known to those versed in the art, it is common practice to provide a drive for a record player which comprises a motor that drives a friction wheel, and which friction wheel is in engagement with the inside of the rim of the turntable to drive the same.

One of the problems has been to provide a drive which will, in the presence of certain irregularities in the turntable rim, still maintain a constant speed for the turntable. Still another difficulty was realized because as the turntable became loaded, as when a record player of the so-called automatic type was used and the stack of played records became larger, such loading had a direct effect upon the device, causing a slowing down from the desired speed with a resultant loss of tone value in the reproduction.

Various means have been proffered in attempts to overcome these difficulties, and although they have met with some measure of success, the apparatus has been complicated, expensive to manufacture and lacked the ruggedness which is desirable in an apparatus of this character.

By my present invention I have provided an improved phonograph motor drive which is efficient in operation, simple in construction and economical to manufacture. Its simplicity enables it to be ruggedly constructed, assures of long service and eliminates any necessity for adjustment after the first installation.

Still other advantages of the invention, and the invention itself, will become more apparent from the following description of an embodiment thereof, which description is illustrated by the accompanying drawings and forms a part of this specification.

In the drawings:

Fig. 1 is a side elevational view of a motor and drive for a phonograph shown mounted in position under a turntable;

Fig. 2 is a plan view thereof with certain parts broken away to show the underlying construction and showing a fragment of the turntable;

Fig. 3 is a section taken along the line 3—3 of Fig. 2 through the friction wheel and its mounting; and Fig. 4 is a plan view of the friction wheel support removed from the assembly.

Generally, the device of my invention includes a motor which is supported by a mounting plate, the shaft of which is in contact with an idler wheel having a rubber rim which in turn engages with the inside rim of the turntable. The idler wheel is carried on a sliding support which is spring biased to bring it into the correct position for wedging driving engagement between the motor shaft and the turntable.

Referring to the drawings, throughout which like parts have been designated by like reference characters, a base or supporting plate is shown at 10 and is provided with three downwardly and outwardly extending legs 11 in which are disposed rubber mounting grommets 12. The rubber grommets are provided with metal sleeves 13 through which bolts or screws may extend for securing the base into a support where it is disposed in proper driving relation to a turntable.

The motor, which may be of the self starting induction type, includes the stator laminations 14 and the winding 15 carried thereby, which is provided with leads 16 for connection to a source of alternating current.

The usual armature is provided at 17, being journalled in bearings 18 and 19, the bearing 18 being carried by the frame 10 and the bearing 19 by a bracket 20. The stator is supported from the plate 10 by bolts 21 which extend through the plate 10 and through the laminations of the stator, the stator laminations being held in properly spaced relation from the plate 10 by spacer sleeves 22 which surround the bolts between the plate and the stator laminations. The lower bearing bracket 20 is also secured in position by the bolts 21 which extend through the ends of the bracket and which is held thereon by the nuts 23.

The armature shaft extends upward through the bearing 18 and is provided with a drive portion 25, the size of which may determine the speed of the turntable.

The idler wheel assembly includes a support for the wheel which is shown in plan in Fig. 4 and in section in Fig. 3. It includes a body portion 30 of generally triangular formation which is formed with an elongated opening 31 extending longitudinally of the body at one end. A pair of ribs 32 extend along the margins of the body. The ribs are adapted to form a bearing surface for the member against the under side of the plate 10, and the body is held in position on the under side of the plate by the screw 21 which is provided with a shoulder head 21a extending through the aperture 31 and of a size to allow the member 30 to slide thereon but prevent lateral movement at the points of engagement with the aperture 31. The sleeve abuts the shoulder 21a and holds the member 30 in place but still allows free sliding movement thereof.

At the wide end or base of the triangular body there is provided an upwardly extending portion 33 which then extends outwardly at 34 to provide an offset arm.

A bushing 35 is carried by the arm 34 adjacent the base, and is provided with a reduced extension 36 that extends below the arm. The bushing supports a shaft 37, which shaft carries the idler wheel. The lower end of the shaft extends beyond the end of the bushing and is held in place by a key 38 which may be a split ring seated in a groove in the end of the shaft. Washers are provided between the key and the bushing, and a felt washer 39 is provided surrounding the reduced end of the bushing and in engagement with the washers. The felt may be saturated with a lubricant that is transmitted to and keeps the shaft properly lubricated.

The end 34 widens out, as can best be seen in Fig. 4, to provide a bearing surface adapted to bear on a rib 40 formed on the upper surface of the plate 10. The plate 10 is provided with an opening 41 which allows the offset portion and the bushing 35 to be inserted therethrough prior to the attachment of the idler wheel and its stem 37, and which provides a sufficient clearance space to allow relative free movement of the bushing 35 and the offset portion therethrough. The opening 41 is of generally circular form provided with a straight side 42 forming a chord of the circle adjacent to the rib 40. The part 34 is provided with an upwardly slanting lug 43 which is apertured to receive the hooked end of a spring 44, the other end of which is hooked onto a lug 45 struck upwardly from the plate 10. The spring pulls the support over toward the chord part 42 of the aperture 41 and toward the drive shaft 25.

The idler wheel is formed in two parts and comprises the circular center portions 50, each of which is provided with oppositely offset flanges 51 that provide a channel therearound in which is clamped the rubber friction ring 52.

It will be noted that the spring 44 pulls the slidable support for the idler wheel together with the wheel into frictional driving contact with both the drive shaft 25 and the rim 55 of the turntable. The pressure thus exerted by the spring is relatively light. The direction of rotation of the parts is indicated by the arrows in Fig. 2, and that this rotation is such that the resultant forces tend to wedge the idler wheel into closer driving engagement with the turntable. Upon de-energization of the motor, the inertia of the turntable tends to move the idler wheel out of driving engagement, relieving the wedging pressure, so that when the apparatus is idle, the only pressure exerted is by the spring 44 which, as stated, is relatively light. This prevents the friction surface 52, which may be of rubber or other desirable friction material, from becoming deformed at its point of contact with the drive shaft and the turntable rim during long periods of idleness.

It will be noted that the manner of supporting the idler support is such that should any wear occur due to its operation, such wear will have substantially no effect upon its subsequent operation, and, therefore, the apparatus may operate over a long period of time at full efficiency. It is also apparent that the manner of supporting the idler wheel is such that a minimum of frictional losses are realized, and that it will be unnecessary to lubricate the support itself. This is a decided advantage, because it is well known that the temperature rise due to the proximity of the motor is considerable and this heat results in the drying out of the lubricant, which leaves a gummy residue that impairs, if not completely hinders, the freedom of operation thereof, making frequent cleaning essential.

It will also be seen that the structure lends itself ideally to an extremely economical construction. Furthermore, since the number of parts are reduced, and the manner of supporting the idler support is such that although the parts may move freely in the desired direction, movement in all other directions is restrained which prevents rattles often heard during the reproduction of music.

As can best be seen in Fig. 1, the motor is mounted on the under side of the base 56 which supports the turntable. It will be seen, therefore, that the apparatus can easily be removed for service or repair without removing the turntable by taking out the bolts 57 which pass through the sleeves 13. Having thus described my invention, I am aware that numerous and extensive departures may be made therefor without departing from the spirit or scope of my invention.

I claim:

1. A phonograph motor drive for driving a phonograph turntable by engagement with the rim thereof including a base plate adapted to be supported below the turntable, a motor carried by said base plate and including a stator and an armature, said armature having a driving hub extending through said base plate, an idler wheel for providing frictional driving engagement between said hub and turntable rim including a support therefor, said support including a member disposed below the base plate and having longitudinally extending ribs for sliding bearing engagement therewith, said plate being formed with an opening and guide means carried by said base plate and engaged in said opening, said base plate being formed with an opening therein and said idler wheel support having an upwardly extending portion extending through said opening and provided with a laterally extending portion extending above said base plate, and a rib on said base plate for frictional bearing engagement with said laterally extending portion, said idler wheel being provided with a supporting shaft rotatably journalled in said bearing means, and spring means connected between said idler wheel support and said base plate for moving the support with the idler wheel into frictional driving engagement with the hub and turntable rim.

2. A phonograph motor drive for driving a phonograph turntable rotatably supported on a base, by engagement with the rim of the turntable including a base plate adapted to be supported below the turntable, mounting means for removably connecting said base plate to said base from below the turntable, a motor carried by said base plate and including a stator and an armature, said armature having a driving hub extending through said base plate, an idler wheel for providing frictional driving engagement between said hub and turntable rim including a support therefor, said support including a member disposed below the base plate and having longitudinally extending ribs for sliding bearing engagement therewith, said plate being formed with an opening and guide means carried by said base plate and engaged in said support opening, said base plate being formed with an opening therein and said idler wheel support having an upwardly extending portion extending through said opening and provided with a laterally extending portion extending above said base plate in the opposite direction to said member, and a rib on said base plate for frictional bearing engagement with said laterally extending portion, bearing means carried by said laterally extending portion, said idler wheel being provided with a supporting shaft rotatably journalled in said bearing means, and spring means connected between said idler wheel support and said base plate for moving the support with the idler wheel into frictional driving engagement with the hub and turntable rim.

3. A transmission mechanism for frictionally transmitting a driving force from a motor shaft to a turntable rim including a supporting base, an idler wheel support including a portion extending below the base and slidably engaged therewith and a portion integral with said first named portion extending above the base, and an idler wheel rotatably supported thereon and spring means connected to the support and base for slidably moving the support on the base and idler wheel into frictional driving engagement with the motor shaft and the turntable rim.

4. A transmission mechanism for frictionally transmitting a driving force from a motor shaft to a phonograph turntable rim, a supporting base, an idler wheel support including an intermediate bearing portion and an idler wheel journalled therein, a second portion extending laterally from said bearing portion and slidably engaged with said supporting base on one side thereof, a third portion extending laterally from said intermediate portion and slidably engaged with said base on the opposite side thereof, and spring means connected to said support and base for slidably moving said support on the base to bring the idler wheel into driving engagement with the motor shaft and turntable rim.

5. A transmission mechanism for frictionally transmitting a driving force from a motor shaft to a phonograph turntable rim including a supporting base, an idler wheel support including an intermediate bearing portion and an idler wheel rotatably journalled therein, a portion of said support extending laterally from said bearing portion and disposed in sliding engagement with said supporting base on the upper side thereof, a second portion of said support offset downwardly from the bearing and extending laterally from the bearing in the opposite direction to the first portion and disposed in slidable engagement with the underside of said support, and spring means connected to the idler wheel support and base for holding the idler wheel in driving engagement with the rim and motor shaft.

6. A transmission mechanism for frictionally transmitting a driving force from a motor shaft to a phonograph turntable rim including a supporting base, an idler wheel support including an intermediate bearing portion and an idler wheel rotatably journalled therein, a portion of said support extending laterally from said bearing portion and disposed in sliding engagement with said supporting base on the upper side thereof, a second portion of said support offset downwardly from the bearing and extending laterally from the bearing in the opposite direction to the first portion and disposed in slidable engagement with the underside of said support, said last mentioned portion being formed with a guide slot therein and a guide means on said base disposed in said slot for holding the support and guiding its movement, and spring means connected to the idler wheel support and base for holding the idler wheel in driving engagement with the rim and motor shaft.

7. A transmission mechanism for frictionally transmitting a driving force from a motor shaft to a phonograph turntable rim including a supporting base, an idler wheel support including an intermediate bearing portion and an idler wheel rotatably journalled therein, a portion of said support extending laterally from said bearing portion and disposed in sliding engagement with said supporting base on upper side thereof, a second portion of said support offset downwardly from the bearing and extending laterally from the bearing in the opposite direction to the first portion and disposed in slidable engagement with the underside of said support, said last mentioned portion being formed with a guide slot therein and a guide means on said base disposed in said slot for holding the support and guiding its movement, and spring means connected to the idler wheel support and base for holding the idler wheel in driving engagement with the rim and motor shaft, said base being formed with an opening therein and said intermediate bearing portion being disposed in said opening and freely movable therein.

GEORGE E. REDFIELD.

REFERENCES CITED

The following references are of record in the file of this patent:

UNITED STATES PATENTS

| Number | Name | Date |
| --- | --- | --- |
| 2,161,148 | Erwood | June 6, 1939 |
| 2,244,120 | Schneider | June 3, 1941 |
| 2,261,889 | Schneider | Nov. 4, 1941 |
| 2,325,602 | Gay | Aug. 3, 1943 |
| 2,386,503 | Pressley | Oct. 9, 1945 |